April 26, 1927.
F. GAUNT ET AL
1,626,581
GAS REGULATOR
Filed Nov. 12, 1926
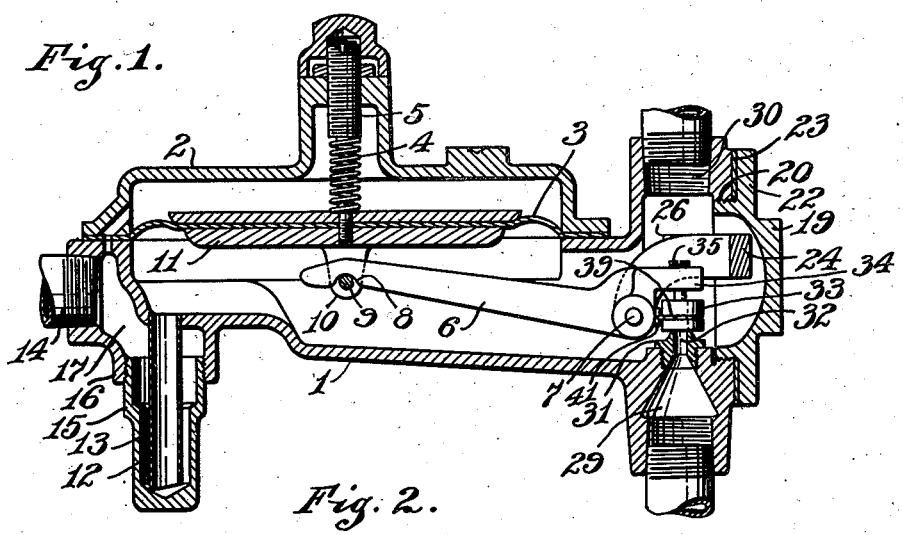
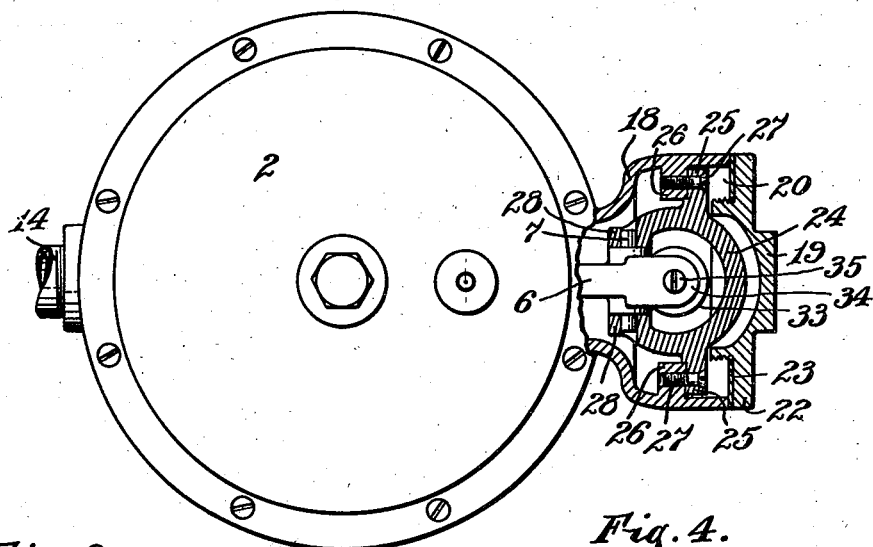
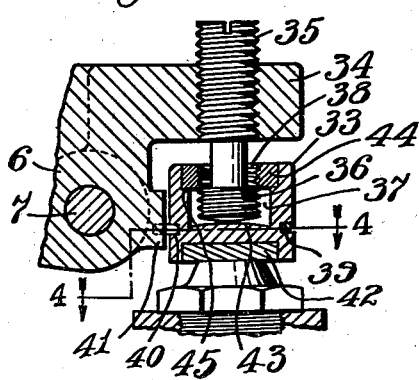
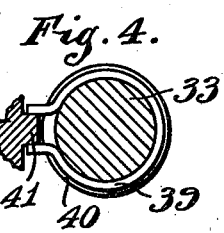
INVENTORS
Floyd Gaunt, Myron B. Reynolds
and Ralph C. Hughes
BY
Hood + Hahn
ATTORNEYS Patented Apr. 26, 1927.

1,626,581

UNITED STATES PATENT OFFICE.

FLOYD GAUNT, MYRON B. REYNOLDS, AND RALPH C. HUGHES, OF ANDERSON, INDIANA, ASSIGNORS TO REYNOLDS GAS REGULATOR CO., OF ANDERSON, INDIANA, A CORPORATION OF INDIANA.

GAS REGULATOR.

Application filed November 12, 1926. Serial No. 147,926.

Our invention relates to improvements in pressure regulating valves and has for one of its objects that of providing means for mounting the operating lever of the valve in such a manner that the same may be readily and bodily removed for the purpose of adjustment, repairs etc. without disassembling the entire structure.

Another object of our invention is to provide means for mounting the valve in such a manner that while the same will have a limited freedom of movement on its mounting support it may readily be removed to permit the replacement thereof or to permit repairs etc.

For the purpose of disclosing our invention we have illustrated one embodiment thereof in the accompanying drawings in which—

Fig. 1 is a vertical sectional view of a regulator embodying our invention;

Fig. 2 is a plan view thereof partly in section;

Fig. 3 is a detail section of the valve mounting, and

Fig. 4 is a sectional view on the line 4—4 of Fig. 3.

In the structure illustrated the pressure regulator includes a regulator casing having a body portion 1 and a cover 2 detachably connected thereto. A flexible diaphragm 3 is clamped between the body 1 and cover 2 and is held upwardly by the pressure of the gas on the lower side thereof against the resistance of a spring 4, the pressure of which may be adjusted by a screw 5.

To the lower side of the diaphragm there is attached one end of a lever 6 pivoted at 7. The end of the lever adapted to be attached to the diaphragm is provided on its under face with a notch 8 and the lever at this notched point rests upon a cross pin 9 between the ears 10 depending from the diaphragm plate 11. This construction, while causing the lever to be moved with the diaphragm, at the same time permits of a quick and ready disconnection of the lever therefrom without the removal of screws or pins, the space between the diaphragm plate 11 and the pin 9 being sufficient to permit the lever to be raised off of the pin and slipped from between the ears.

The body portion of the regulator is provided with a relief opening having an extended tube 12 terminating in a mercury well 13 and communicating with an escape port or pipe 14. The well 13 is formed in a removable plug 15 threaded into the walls 16 which are preferably formed as a part of the casing 1 but which form a separate chamber 17.

The casing 1 is provided with a reduced lateral extension 18 which comprises the valve housing and this extension is closed at its end by a threaded plug 19 screw threaded into the walls of an end opening 20 in the housing and provided with an annular flange 22 seating against the face 23 of the housing.

Removably mounted within the housing 18 is a removable pivotal support for the lever 6. This support comprises a ring 24 having laterally extending ears 25 which are secured to lugs 26 formed on the inner wall of the housing 18. These ears are secured against the front face of the lugs by means of screws 27 so that by the removal of these screws the ring 24, and with it the lever 6, may readily be bodily removed through the opening 20 in the end wall of the housing 18. The rear portion of the ring 24 is downwardly curved and forms a pair of separated ears 28 between which the lever 6 is suspended on a pivot pin 7 passing through the ears 28 and the lever.

The valve housing 18 is provided with a gas intake passage 29 and an outlet passage 30 which permit the gas, the pressure of which is to be regulated, to pass into the valve housing and exert an upward pressure against the diaphragm 3. The upper end of the inlet port 29 receives a threaded thimble 31 which forms the valve seat and is provided with a reduced opening 32. The valve 33 which co-operates with the seat 31 is suspended from one end 34 of the lever 6 by means of a threaded adjustable support 35, threaded into the lever end. This support towards its lower end has a reduced portion terminating in an enlarged threaded portion 36, the bottom face of which is rounded. The valve 33 comprises a cylindrical block the top of which is recessed as at 37, the recess having a larger diameter than that of the threaded head 36 and having its bottom rounded as at 43. The top of this recess or socket 37 is closed by a disc 44 which has a wedge fit in an enlarged portion of the recess and seats against a shoulder 45 in the side wall of the recess. This disc has a central screw threaded opening 38 through which the end 36 of the screw 35 may be threaded to a position within the recess. The valve 33 is thus hung on the adjustable threaded stem 35 so that it will have a certain amount of freedom of movement on the stem to permit it to adjust itself to the valve seat. This freedom of movement is increased by the rounding of the lower end of the head 36 and the rounding of the bottom 43 without materially increasing the clearance between the valve and the head so that, while the valve has a free tilting movement, it will at the same time respond quickly to the raising action of the lever and have a minimum of lost motion. To prevent the valve from turning after it has been threaded into position, a snap ring 39 engages in an annular groove 40 in the valve and has its free ends engaging on opposite sides of a lug or projection 41 on the lever 6.

The under face of the valve is recessed to receive a renewable leather or similar facing 42.

We claim as our invention:

1. In a pressure regulator having a casing provided with a valve housing having an opening in its end wall, a removable cover for said opening, a pressure responsive element, a valve operating lever operatively and detachably connected to said pressure responsive element, a support on which said lever is pivoted detachably mounted in said housing and removable through the opening and means for pivotally supporting the lever on said support.

2. In a pressure regulator having a casing provided with a valve housing having an opening in its end wall, a removable cover for said opening, a pressure responsive element, a pair of ears depending from the pressure responsive element and having a cross member, a valve operating lever having one end located between said ears and resting on said cross member, a support on which said lever is pivoted detachably mounted in said housing and removable through the opening and means for pivotally supporting the lever on said support.

3. In a pressure regulator having a casing provided with a valve housing having an opening in its end wall, a removable cover for said opening, a pressure responsive element, a valve operating lever operatively and detachably connected with said pressure responsive element, a yoke support between the free ends of which the lever is pivoted, said support being detachably mounted in said housing and removable through the opening in the wall thereof.

4. In a pressure regulator having a casing provided with a valve housing having an opening in its wall, a removable cover for said opening, a pressure responsive element, a valve operating lever operatively and detachably connected to said pressure responsive element, a valve operating lever operatively and detachably connected to said pressure responsive element, a yoke support for said lever having free ends between which the lever is pivotally mounted and having radially extending ears detachably secured to the walls of said housing and removable with said lever through the opening in the housing wall.

5. In a pressure regulator having a casing provided with a valve housing having an opening in its end wall, a removable cover for said opening, inwardly presented lugs formed on the walls of said housing, a pressure responsive element, a valve operating lever operatively and detachably connected to said pressure responsive element, a yoke having free ends between which the lever is pivoted and provided with ears detachably connected to the lugs in said housing, said yoke and lever being bodily removable through the opening in the wall of said housing.

In witness whereof, we have hereunto set our hands at Anderson, Indiana, this 8th day of November, A. D. one thousand nine hundred and twenty six.

FLOYD GAUNT.
RALPH C. HUGHES.
MYRON B. REYNOLDS.